United States Patent [19]

Horii

[11] Patent Number: 4,578,759

[45] Date of Patent: Mar. 25, 1986

[54] SHEET DISTRIBUTING APPARATUS

[75] Inventor: Tetsuo Horii, Yokohama, Japan

[73] Assignee: Tokyo Shibaura Denki Kabushiki Kaisha, Kawasaki, Japan

[21] Appl. No.: 717,482

[22] Filed: Mar. 29, 1985

Related U.S. Application Data

[63] Continuation of Ser. No. 422,175, Sep. 23, 1982, abandoned.

[30] Foreign Application Priority Data

Sep. 29, 1981 [JP] Japan ............................... 56-154232

[51] Int. Cl.[4] ........................ G06F 15/20; G06K 5/00; B07C 3/18

[52] U.S. Cl. .................................... 364/478; 209/900; 365/49

[58] Field of Search ................ 209/900; 235/462-467; 271/2; 364/478; 365/49, 50

[56] References Cited

U.S. PATENT DOCUMENTS

| | | | |
|---|---|---|---|
| 3,518,631 | 6/1970 | Lindquist et al. | 365/49 X |
| 3,648,254 | 3/1972 | Beausoleil | 364/49 X |
| 4,117,975 | 10/1978 | Gunn | 235/494 |
| 4,358,016 | 12/1982 | Richardson et al. | 364/478 X |

FOREIGN PATENT DOCUMENTS

| | | |
|---|---|---|
| 1218773 | 3/1962 | Fed. Rep. of Germany . |
| 2335274 | 7/1977 | France . |
| 808892 | 2/1959 | United Kingdom . |
| 939233 | 10/1963 | United Kingdom . |
| 1186922 | 4/1970 | United Kingdom . |
| 1488622 | 10/1977 | United Kingdom . |
| 2097330 | 11/1982 | United Kingdom . |

OTHER PUBLICATIONS

Das Index-System; Von G. Van Mechelen; pp. 30-35; Elektrisches Nachrichtenwesen; Band 44, Nummer 1, 1969.

Postal Mechanization; Allen Bailey; pp. 20-22; Canadian Electronics Engineering; Nov. 1976.

Progress in Postal Engineering; N. C. C. de Jong; pp. 203-211; Post Office Elec. Eng. J. (GB), vol. 63, (Jan. 1971).

*Primary Examiner*—Jerry Smith
*Assistant Examiner*—Allen MacDonald
*Attorney, Agent, or Firm*—Cushman, Darby & Cushman

[57] ABSTRACT

A sheet distributing apparatus comprises a keyboard for keying in a name on sheet mail and a processor which encodes the keyed-in name in accordance with a look-up table. The processor is instructed to input a number address when there is the same name and to input a block name when there is the same name with the same number address. The processor then encodes the name in accordance with the number address or a combination of the number address and block name. The encoded name is printed on the sheet mail by a code printer. The printed encoded name is read by a code reader so that a mail sorter distributes the sheet in accordance with the encoded name.

3 Claims, 6 Drawing Figures

FIG. 5

100

| ADDRESS | NAME | FLAG | NUMBER ADDRESS | FLAG | CODE | |
|---|---|---|---|---|---|---|
| 0000 | TARO TOSHIBA | 1 | 70 | 1 | 0000 | "A" YANAGI |
| | TETSUO HORII | 0 | 70 | 0 | 0001 | |
| | TARO TOKYO | 0 | 70 | 0 | 0002 | |
| | ⋮ | 106 | 108 | 110 | 112 ⋮ | |
| 102 | ZIRO TOSHIBA | 1 | 71 | 0 | 0050 | |
| | ⋮ | | | | ⋮ | |
| 0099 | | | | | 0099 | |
| | KEN YOKOHAMA | 0 | 50 | 0 | 0100 | "B" HORIKAWA |
| | ZIRO TOSHIBA | 1 | 50 | 0 | 0101 | |
| | ⋮ | | | | ⋮ | |
| | TARO TOSHIBA | 1 | 70 | 1 | 0150 | |
| | ⋮ | | | | ⋮ | |
| 0199 | | | | | 0199 | |
| | TARO TOSHIBA | 1 | 70 | 1 | 0200 | "C" KOMUKAI |
| | | | | | 0201 | |
| | ⋮ | | | | ⋮ | |
| 0299 | | | | | | |
| | | | | | | |

SHEET DISTRIBUTING APPARATUS

This is a continuation of application Ser. No. 422,175, filed Sept. 23, 1982, which was abandoned upon the filing hereof.

BACKGROUND OF THE INVENTION

This invention relates to a sheet distributing apparatus particularly for distributing sheet mail.

An automatic mail processing system which automatically processes sheet mail has been known. In the conventional automatic mail processing system, postal numbers written on sheet mail are read out and the sheet mail is distributed in accordance with the postal numbers. In general, this mail distribution by postal numbers is effected to transport sheet mail from a mail collecting post office to delivery post offices in the respective areas. About 50,000 pieces of sheet mail are brought into each delivery post office a day and are distributed there into a number of delivery sections (e.g., 50 sections). The postal numbers cannot be used in this distribution. Rather, an operator reads the addresses on the sheet mail to distribute and arrange the sheet mail in proper delivery order. The mail distribution in the delivery post office is performed semiautomatically. The operator reads the addresses on sheet mail which is fed to a coding desk one by one and adds to the sheet mail codes corresponding to the respective addresses through a key operation or by acoustic input. The codes are read by a code reader which generates code signals. The sheet mail is sorted in accordance with the code signals.

The aforementioned conventional mail processing system has a drawback in that the sheet mail may not be distributed accurately because keyed-in information such as a number address and a block name can be insufficient or incorrect (for example, a wrong address is given due to the change in number address).

SUMMARY OF THE INVENTION

It is the principle object of this invention to provide a sheet distributing apparatus capable of distributing sheet mail accurately even if the address on the sheet mail is insufficient.

The sheet distributing apparatus according to this invention comprises means for encoding names on sheet mail and which are inputted as input information, a code printer for printing the encoded names on the sheet mail, a code reader for reading the encoded names and a sorter for sorting the sheet mail in accordance with the encoded names.

If the name on the sheet mail is not unique (i.e., it appears more than once in a database of names), the information in the smallest address information section (a), i.e., a number address, is added as additional input information. If the name and number address is likewise not unique, the information of the next larger address information, section (b) (i.e., a block name) is further added as additional input information. The mail distribution can therefore be effected accurately and swiftly by supplying additional input information sequentially from the smallest address section until the largest address section according to the need (i.e. additional identifying information is supplied only when necessary to uniquely identify the addressee).

BRIEF DESCRIPTION OF THE DRAWINGS

FIG. 5 is a look-up table showing code information to be stored in a processor.

DETAILED DESCRIPTION OF THE PREFERRED EMBODIMENT

Figure 1:
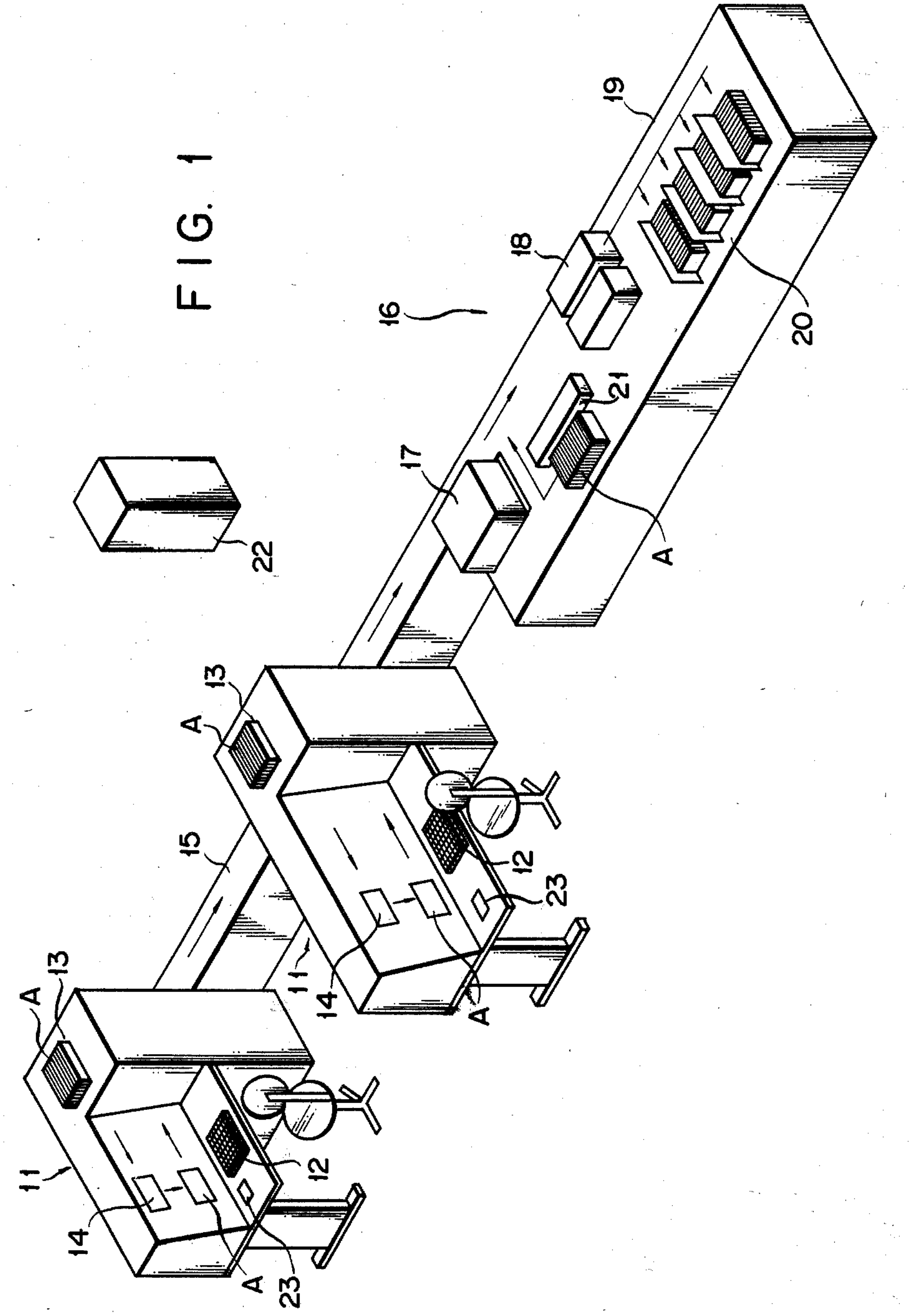
FIG. 1 is an oblique view showing a sheet distributing apparatus according to an embodiment of this invention.

In FIG. 1, a plurality of keyboard tables 11 are shown. Each keyboard table 11 comprises a keyboard 12 for keying in (e.g. manually inputting) input information, a mail feeder 13 in which sheet mail A (hereinafter referred to as mail) to be distributed is set and a mail window 14 for reading a name, etc. on mail A fed from the mail feeder 13. A mail conveyor 15 is continuously disposed along one side of the keyboard tables 11. A mail sorting section 16 is provided at a distal end portion of the mail conveyor 15. A code printer 17 and a code reader 18 are sequentially arranged on the mail sorting section 16 in the longitudinal direction of the mail conveyor 15. A mail sorter 19 is disposed at the outlet side of the code reader 18. The mail sorter 19 is of a known type which distributes pieces of mail and feeds each piece to one of a plurality of mail boxes 20. A mail feeder 21 is disposed on the mail sorting section 16 to further distribute the mail which has been already distributed once (e.g., the mail in the mail boxes 20) and feed it to the mail sorter 19 through the code reader 18. A processor 22 is provided to encode the keyed-in input information and control the code printer 17, code reader 18 and mail sorter 19.

Figure 2:
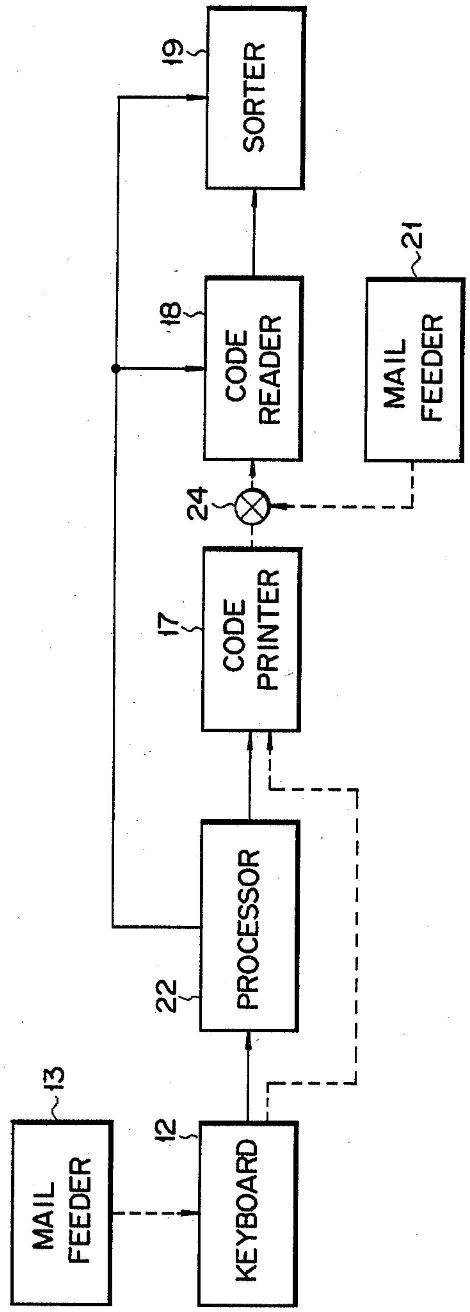
FIG. 2 is a block circuit diagram showing the sheet distributing apparatus shown in FIG. 1.

As shown in FIG. 2, the keyboard 12 is coupled to the processor 22. Processor 22 is connected to the code printer 17, code reader 18 and the mail sorter 19. The transfer course of the mail A is indicated by the dotted line which sequentially connects the mail feeder 13, keyboard 12, code printer 17 and code reader 18.

Figure 3:
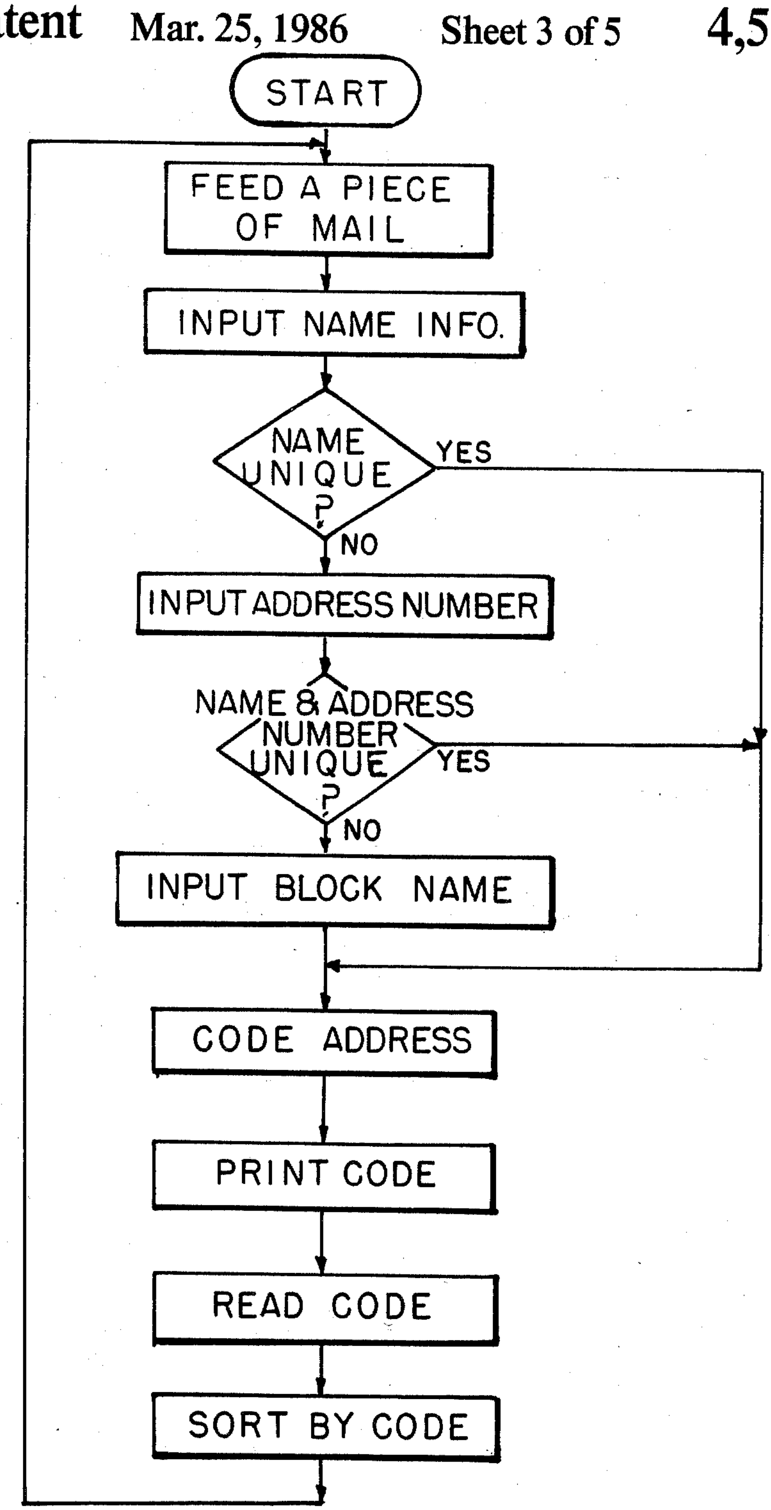
FIG. 3 is a flow chart depicting the operation of the sheet distributing apparatus shown in FIG. 2.

Referring to the flow chart of FIG. 3, the operation of the sheet distributing apparatus will be described.

Figure 4:
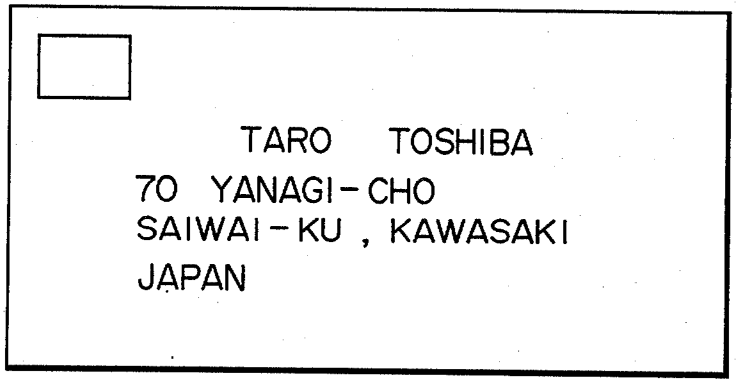
FIG. 4 is a front view of sheet mail.

When the mail A is set in the mail feeder 13, a piece of mail A (as shown in FIG. 4, for example) is fed to the mail window 14. An operator keys in the name (for example, "TARO TOSHIBA") imprinted on the mail A through the keyboard 12. The keyed-in name information is supplied to the processor 22. Processor 22 includes a conventional memory which stores the information corresponding to the look-up table 100 shown in FIG. 5. Look-up table 100 comprises a plurality of entries 102. Each entry 102 comprises a name field 104, a name flag 106, a number address field 108, a number address flag 110 and a code field 112. According to the look-up table 100 of FIG. 5, name flag 106 associated with an entry 102 in the look-up table is set to "1" when the name field 104 of that entry corresponds to the name field of another entry in table 100. Each of entries 102 is placed into one of a plurality of blocks ("A", "B", "C" etc.) which may, for instance, correspond to street names. For instance, the names stored in memory addresses 0000 to 0099 belong to a second address information block A (e.g., YANAGI), while the names stored in memory addresses 0100 to 0199 and 0200 to 0299 belong to second address information blocks B (e.g., HORIKAWA) and C (e.g., KOMUKAI), respectively. The address flag 110 of an entry 102 and the name flag 106 of an entry are both set to "1" when the name field 104 and the number address field 108 both correspond to the respective name and number address fields of another entry in table 100.

When the name information "TARO TOSHIBA" keyed in through the keyboard 12 is supplied to the processor 22 as described above, processor 22 searches the block A (i.e., the memory addresses 0000 to 0099) for "TARO TOSHIBA". As seen from FIG. 5, the searched "TARO TOSHIBA" entry 102 has the name flag 106 set to "1". The processor 22 therefore determines that name is not a unique identifier and then displays the result on a display section 23 on the keyboard table 11. When confirming the display on the display section 23, the operator keys in the information of the smallest address section, i.e., number address "70" to further identify the addressee. As shown in FIG. 5, the "TARO TOSHIBA" entry 102 has its number address flag 110 set to "1" so that the processor 22 determines that the name and number address information cannot serve to uniquely identify the addressee. As a result, the result is displayed on the display section 23. When the operator determines that still more information is required to uniquely identify the addressee of the piece of mail A, he keys in the block name "YANAGI" indicating the address section which is next unit larger than the number address. Based on this block name information (YANAGI), the processor 22 determines that the keyed-in "TARO TOSHIBA" corresponds to "TARO TOSHIBA" stored in one of the addresses 0000 to 0099. Then, the processor 22 encodes the input information to the code "0000" corresponding to the keyed-in name information. As clearly seen from the above description, the addressee information can be encoded through, at most, three key-in operations for input information when there are more than two entries 102 with the same name with the same number address. However, when a unique name (for example, "TARO TOKYO") is keyed in, "TARO TOKYO" is immediately encoded to "0002". Likewise, if none and address number are enough to uniquely identify an addressee, the name information is encoded when its number address is keyed in.

When the name on the mail A set on the mail window 14 is encoded, the operator depresses an end-of-encoding key to transfer the mail A to the mail conveyor 15 from the mail window 14. Then, a new piece of mail A is fed to the mail window 14 from the mail feeder 13.

Figure 6:
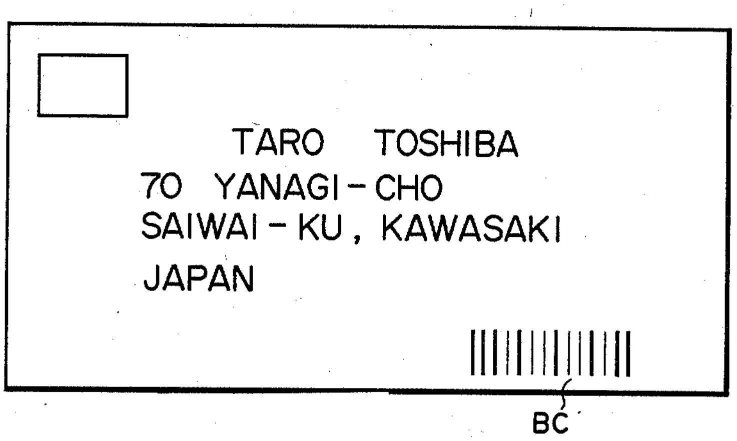
FIG. 6 is a front view of sheet mail on which a code is printed.

The mail A on the mail conveyor 15 is transferred to the mail sorting section 16. When the mail A is transferred to the code printer 17, the code printer 17 prints a code (which corresponds to the code field 112 of the appropriate entry 102) supplied from the processor 22 on the mail A as, for example, a bar code (BC) as shown in FIG. 6. Then, the mail A is transferred to the code reader 18 which reads the printed code (e.g. "0000"). The mail A is then transferred to the mail sorter 19 which sorts and feeds it to the one of mail boxes 20 corresponding to the block name A to which the printed code "0000" belongs. Similarly, all the pieces of mail in the mail feeder 13 are sequentially transferred to the mail sorter 19 and sorted to the respective mail boxes 20.

If it is necessary to further sort the sorted mail, the pieces of mail in a desired mail box, for example, corresponding to the block name A, is sent to the mail feeder 21. The mail feeder 21 transfers the pieces of mail one by one to the code reader 18 through a gate 24. The mail is transferred to the mail sorter 19 which is set by this time to an additional-sorting mode. The mail is sorted there and fed to the respective mail boxes 20 in accordance with the codes read by the code reader 18. For example, the mail can be sorted in order of code.

As described above, according to this invention, codes are predetermined with respect to corresponding names on mail. When a name is supplied to the sheet distributing apparatus of this invention as input information, the name information is encoded to a corresponding code. Then, the code is printed on the mail by a code printer. The printed code is read by a code reader so that a mail sorter distributes the mail according to the code. If the name is not a unique identifier, address display information from the smallest address section to the largest address section is sequentially supplied to the sheet distributing apparatus according to the need. As a result, the inputted name information is accurately distinguished from other identical names and encoded. Basically, mail is sorted in accordance with names on the mail. Therefore, the mail is accurately sorted even if its address information is insufficient.

In the aforementioned embodiment, the code printing, code reading and mail sorting are effected as a sequential step. However, the code printing may be effected separately from the code reading and mail sorting. For example, the code printing can be effected in a branch post office whereas both code reading and mail sorting can be concentrated in a main post office. Both first name and last name are used as input information in this embodiment. Instead, the last name alone can be used as input information and in this case, the first name can be inputted as additional input information when other potential addressees have the same last name. Further, single keystrokes can be used for inputting names of companies, schools, buildings, apartments, etc. When an input name information is not found in a look-up table, for example, when a wrong name is inputted by misspelling, it is possible to read out and display the name information of the look-up table which is similar to the wrong input name information for confirmation. A processor and a code printer can be built into each keyboard table. It is not necessary to key in the name information. The name information can be read by an OCR or can be inputted as acoustic information.

In the above embodiment, the sheet distributing apparatus according to this invention has been described as an apparatus for distributing sheet mail. However, this invention is not limited to this embodiment but can be applied to any apparatus for distributing sheets in accordance with names.

What is claimed is:

1. A method of sorting sheet mail comprising the steps of:

(1) inputting information corresponding to the name of the addressee of a piece of sheet mail;
(2) determining whether said name information identifies only one of a plurality of categories into which said sheet mail is to be sorted;
(3) inputting information corresponding to the street number of said addressee in response to a determination in said determining step (2) that said name identifies more than one of said plurality of categories;

(4) if a street number has been inputted in said inputting step (3), determining whether the combination of the name and street number information identifies only one of said plurality of categories;

(5) inputting information corresponding to a street name in response to a determination in said determining step (4) that the combination of said name and street number information identifies more than one of said plurality of categories;

(6) encoding the address of said addressee in response to said inputted information; and (7) routing said sheet mail into one of said plurality of categories in response to said encoded address, wherein said determining steps (2) and (4) and said encoding step (6) each include the step of searching an look-up table for entries corresponding to the inputted information, and wherein:

said look-up table comprises a plurality of respective entries, each of said plurality of entries comprising at least a name field, a name flag, a number address field, a number flag, a block field and a code field, the name flag of any entry being set only when the name field of that entry is the same as the name field of at least another one of said entries, the number address flag of an entry being set only when the name field and the number address field of that entry are the same as the name field and number address field, respectively, of at least another of said entries;

said determining step (2) includes the steps of:

searching said look-up table to locate an entry having a name field corresponding to said inputted name information, and determining whether the name flag of said located entry is set;

said determining step (4) includes the steps of:

searching said look-up table to locate an entry having a name field and number address field which respectively correspond to said inputted name information and said inputted street number information, and determining whether said number address flag of said located entry is set; and said encoding step (6) includes the steps of:

searching said look-up table to locate an entry having a name field, number address field and block field corresponding to the inputted ones of said name information, street number information and street name information of said inputted information, and extracting the contents of said code field from said located entry.

2. A method as in claim 1 further including the step of imprinting said encoded address onto said piece of sheet mail.

3. A method as in claim 2 wherein said routing step includes the step of physically transporting said piece of sheet mail to a selected one of said plurality of categories, said selected category selected in response to said imprinted encoded address.

* * * * *